(12) United States Patent
Thomas et al.

(10) Patent No.: US 7,458,447 B2
(45) Date of Patent: Dec. 2, 2008

(54) DISC BRAKE ASSEMBLY

(75) Inventors: Paul Anthony Thomas, Newport (GB); Paul Roberts, Newport (GB)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 597 days.

(21) Appl. No.: 10/759,523

(22) Filed: Jan. 16, 2004

(65) Prior Publication Data

US 2004/0163901 A1      Aug. 26, 2004

(30) Foreign Application Priority Data

Jan. 30, 2003     (GB) ................................ 0302186.2

(51) Int. Cl.
*F16D 65/40*     (2006.01)

(52) U.S. Cl. ................................ 188/73.38; 188/205 A

(58) Field of Classification Search ............. 188/77.78, 188/73.31, 73.35, 73.36, 73.37, 205 A
See application file for complete search history.

(56) References Cited

U.S. PATENT DOCUMENTS

| | | | |
|---|---|---|---|
| 3,298,469 A * | 1/1967 | Robinette | 188/72.5 |
| 4,049,087 A * | 9/1977 | Heinz et al. | 188/73.38 |
| 4,773,511 A | 9/1988 | Giering et al. | |
| 4,993,520 A * | 2/1991 | Goddard et al. | 188/73.38 |
| 5,875,873 A * | 3/1999 | Kay et al. | 188/73.38 |

FOREIGN PATENT DOCUMENTS

| | | |
|---|---|---|
| DE | 3222859 | 12/1983 |
| DE | 3227195 | 1/1984 |
| DE | 3612355 | * 10/1987 |
| DE | 198 49 309 | 4/2000 |
| EP | 0 248 385 | * 12/1987 |
| EP | 0 703 378 | * 3/1996 |
| EP | 0744559 | 11/1997 |
| EP | 1 391 628 | 2/2004 |
| GB | 2142394 | 1/1985 |
| GB | 2172352 | 9/1986 |
| GB | 2356027 | 5/2001 |
| WO | WO 03/069180 | 8/2003 |

OTHER PUBLICATIONS

United Kingdom Search Report dated Jul. 23, 2003.
European Search Report dated Jun. 3, 2004.

* cited by examiner

*Primary Examiner*—Bradley T King
(74) *Attorney, Agent, or Firm*—Carlson, Gaskey & Olds

(57) ABSTRACT

A disc brake assembly includes a brake pad, a pad retainer, a brake caliper, and a pad spring. The pad retainer has a planar region situated at a first radius that engages a planar region of the pad spring to restrain radial movement of the brake pad. The pad retainer is secured to an outboard side of the caliper at a second radius and has a crook adjacent to the planar region to allow the second radius to be less than the first radius. The pad spring has a rounded edge adjacent to the crook.

18 Claims, 5 Drawing Sheets

DISC BRAKE ASSEMBLY

REFERENCE TO RELATED APPLICATIONS

This patent application claims priority to Great Britain patent application GB 0302186.2 filed on Jan. 30, 2003.

BACKGROUND OF THE INVENTION

The present invention relates to a disc brake assembly including a pad retainer having a planar region situated at a first radius that engages a planar region of a pad spring to restrain radial movement of a brake pad and the pad retainer is secured to an outboard side of a brake caliper at a second radius, and the pad retainer has a crook that allows the second radius to be less than the first radius.

Known disc brakes 10 (shown in FIGS. 1 to 4) include a disc or rotor 20 mounted to a wheel hub for rotation wit a vehicle wheel. A brake carrier 12 is fixed relative to the axis of rotation of the rotor 20 and is secured to a non-rotating portion of the vehicle (e.g. the vehicle suspension). In "floating caliper" type brakes, a brake caliper 15 including a bridge 16 secured to a housing 14 is slidably mounted on the brake carrier 12 to allow for movement parallel to the axis of rotation of the rotor 20. An actuator 18 communicates with one or more pistons or tappets (not shown) provided in the housing 14 to apply the force required for the brake to function.

A pair of brake pads 22 including friction material 36 mounted to a solid backplate 34 are positioned on either side of the rotor 20. The friction material 36 faces the planar faces of the rotor 20. The backplates 34 of the brake pads 22 are seared on vertical and horizontal abutment regions 28 and 30, respectively, provided in openings 32 in the brake carrier 12 to restrain the brake pads 22 from rotational and radially inward movement, respectively. In a typical "floating caliper" type brake, one of the backplates 34 engages with the piston(s), either directly or via a spreader plate, to distribute the load. The actuator 18 causes the piston to push one of the brake pads 22 towards the rotor 20 to achieve braking. Because the caliper is able to "float" on the brake carrier 12, an equal frictional braking load is applied by both brake pads 22.

The backplates 34 of vehicle disc brake pads 22 perform two functions. First, the brake pads 22 provide a solid support for slidably mounting the friction material 36 of the brake within the brake carrier 12 to transmit the shear loads induced on the friction material 36 during braking to the brake carrier 12. Second, the brake pads 22 transmit and evenly distribute the pressure applied by the brake tappets or the pistons during braking to the surface of the friction material 36 to ensure even wear of the friction material 36. To perform the functions, resilient members (such as a leaf type pad springs 24) are commonly used to restrain radially outward movement (indicated by arrow R) of the brake pads 22 in the brake carrier 12 while permitting movement towards and away (indicated by arrow A) from an associated brake disc and to prevent rattling of the brake pad 22 in use.

The pad springs 24 are typically elongate and, when fitted, extend along a portion of the radially outermost face of the backplate 34. The pad springs 24 are typically pre-loaded to a certain extent against the brake carrier 12 by a pad retainer 26, which spans an opening between the bridge 16 and the housing 14 and contacts the approximate center of the pad spring 24. This force is typically reacted radially outwardly by contact of the backplate 34 with each end of the pad spring 24. Formations are also typically provided on the backplate 34 and/or the pad spring 24 to retain the pad spring 24 on the backplate 34 during movement of the brake pad 22 parallel to the axis of rotation of the rotor 20.

During brake actuation, the backplate 34 and the pad spring 24 move toward and away from the brake disc. If the pad retainer 26 and the pad spring 24 are not parallel (due to loads on the pad spring 24 and/or uneven brake pad 22 wear), the edge 25 of the pad spring 24 tends to indent into the underside 29 of the pad retainer 26, preventing movement of the backplate 34 and inhibiting braking performance. This problem is increased when heavy brake pads are used because a stiffer pad spring is required, which has a greater tendency to indent into the pad retainer 26.

Great Britain patent applications GB2356027, GB2172352 and GB2142394 describe typical known brake pad springs which are made from wire and used to prevent radial movement of a brake pad.

German patent applications DE3222859 and DE3227195 both describe a disc brake pad assembly including pad springs with rounded edges which abut against a pad retainer to restrain radial movement of a brake pad.

SUMMARY OF THE INVENTION

The disc brake assembly of the present invention includes a brake pad, a pad retainer, a brake caliper, and a pad spring. The pad retainer includes a planar region having a first radius that engages a planar region of the pad spring to restrain radial movement of the brake pad. The pad retainer is secured to an outboard side of the caliper at a second radius and has a crook adjacent to the planar region to allow the second radius to be less than the first radius. The pad spring further including a rounded edge adjacent the crook.

By securing the pad retainer to the outboard side of the caliper at a smaller radius, a more compact assembly is possible. The rounded edge on the pad spring adjacent the crook allows the caliper to be designed with the outboard pad being further outboard than known designs while ensuring the pad spring does not indent into the pad retainer. This allows the brake pad to have a larger thickness of friction material than known designs. Alternatively, the rounded edge allows the caliper to be designed with the outboard pad positioned at the same position as known designs, and the components outboard of the crook that secure the pad retainer can be designed at a more inboard position, reducing the overall space envelope for the brake caliper.

Preferably, the pad spring includes an aperture in which a protrusion from a brake pad backplate is located to prevent axial movement between the pad spring and the backplate.

These and other features of the present invention will be best understood from the following specification and drawings.

BRIEF DESCRIPTION OF THE DRAWINGS

The present invention will now be described, by way of example only, with reference to the accompanying drawings in which.

DETAILED DESCRIPTION OF THE PREFERRED EMBODIMENT

Figure 5:
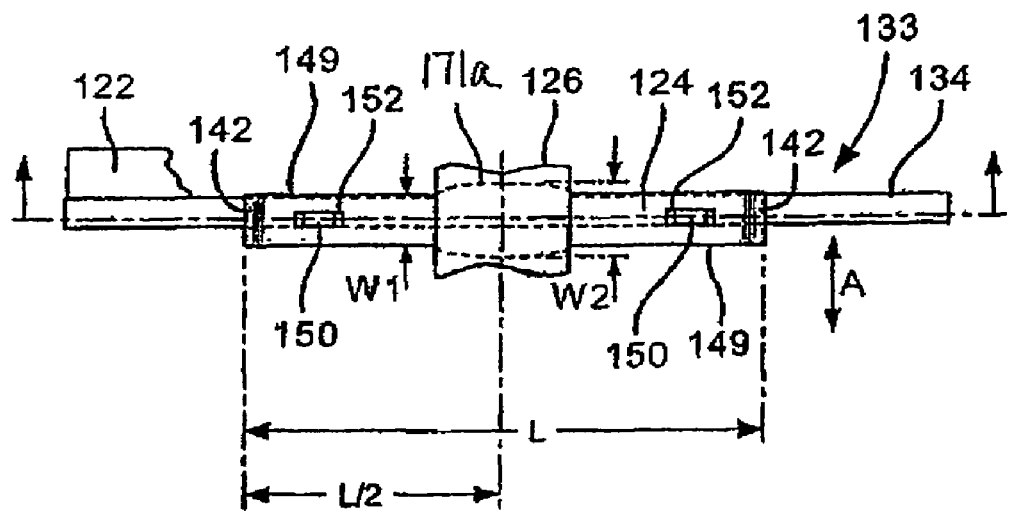
FIG. 5 is a plan view of part of a disc brake assembly according to the present invention.
Figure 6:
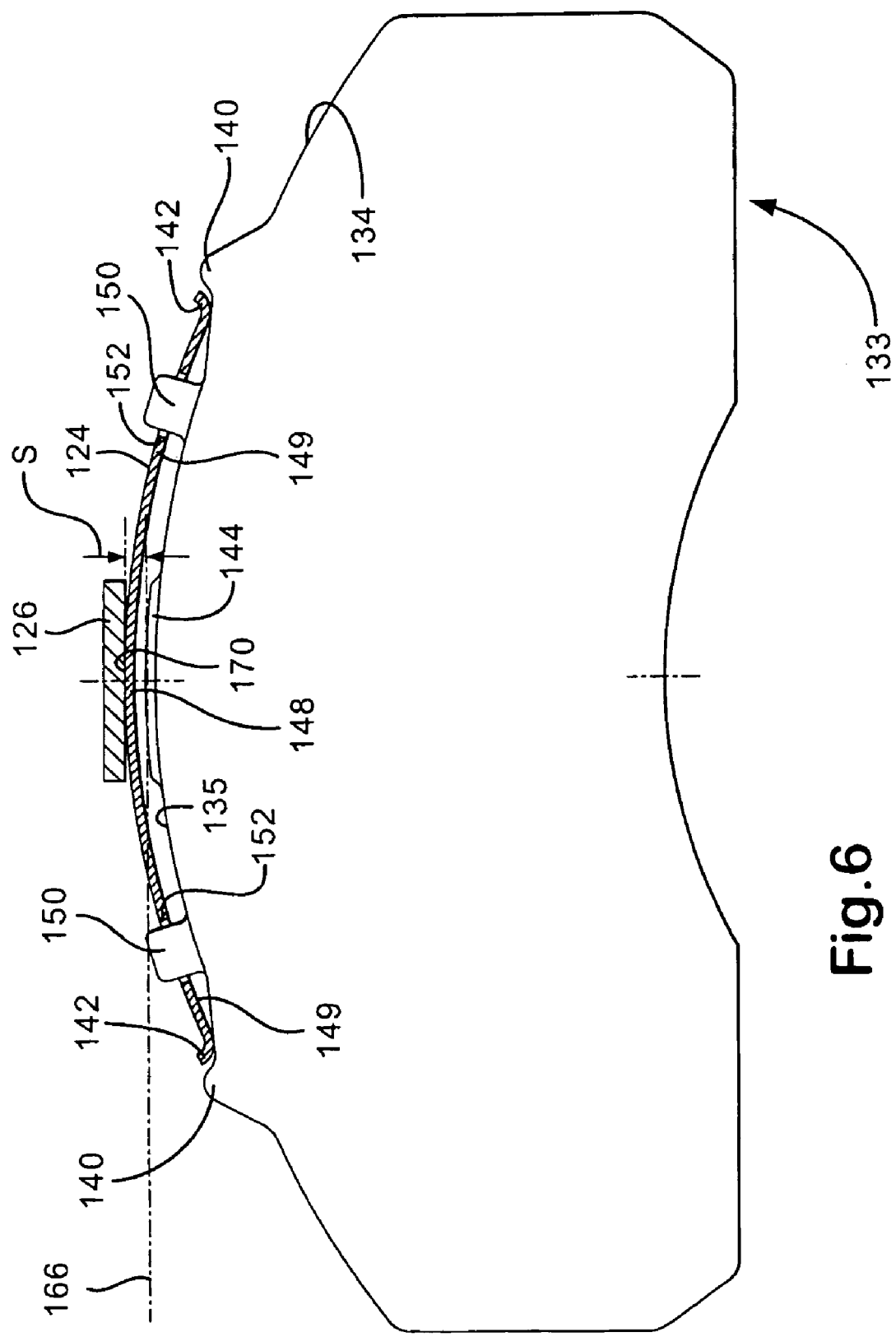
FIG. 6 is an end view of a portion of the disc brake assembly of FIG. 5.
Figure 7:
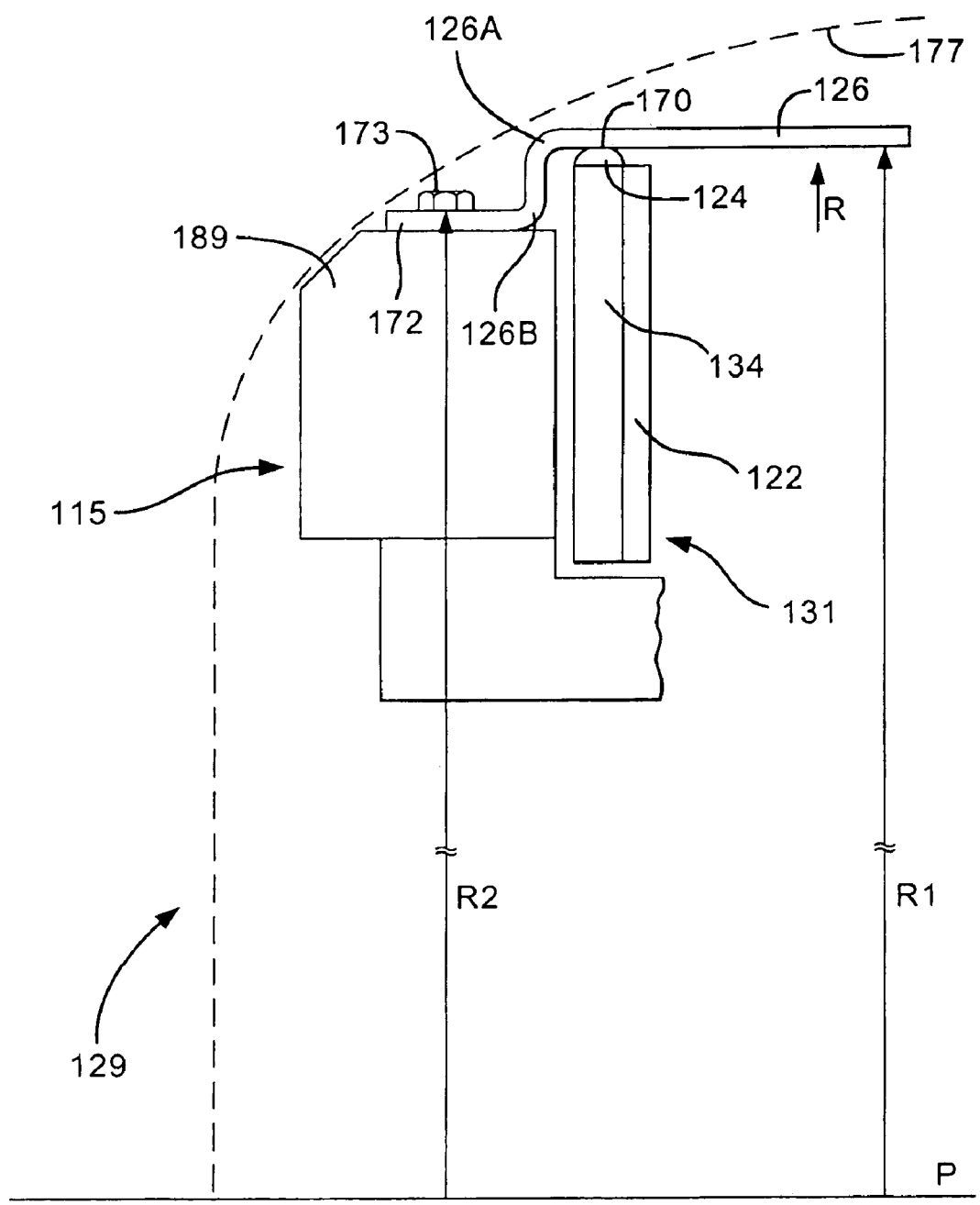
FIG. 7 is a front view of a portion of the disc brake assembly of FIG. 5.

FIGS. 5 to 7 illustrate the disc brake assembly 129 of the present invention including a disc brake pad assembly 133 and a brake caliper 115. The disc brake pad assembly 133 is capable of being fitted into the prior an disc brake 10 described above. The disc brake pad assembly 133 includes a brake pad 131 having a backplate 134 to which friction material 122 is secured. The backplate 134 includes a radially outer edge 135 having a pair of curved surfaces in the form of circumferentially spaced abutments 140. The backplate 134 also include protrusions in the form of a pair of radially outwardly extending backplate lugs 150, which project from the radially outer edge 135 and are located between the abutments 140.

As further shown in FIGS. 5 and 6, a pad spring 124 is elongate and has a length L, a central portion 148 in the middle of the length L of the pad spring 124, and end regions 149. The central portion 148 defines a maximum width W2 of the pad spring 124, and the remainder of the pad spring 124 has a reduced width W1. The pad spring 124 is stamped from sheet metal and is typically 1 mm thick.

When fitted to the backplate 134, the pad spring 124 extends in the circumferential direction transverse to the axis of movement of the backplate 134 towards and away from the rotor 20 when in use (indicated by arrow A). The pad spring 124 is provided with upturned ends 142 and two apertures in the form of slots 152 in the end regions 149 in which the lugs 150 may fit. The abutments 140 on the backplate 134 are shaped to prevent the upturned ends 142 of the pad spring 124 from sliding. The location of the lugs 150 in the slots 152 prevents axial movement between the pad spring 124 and the backplate 134.

Figure 1:
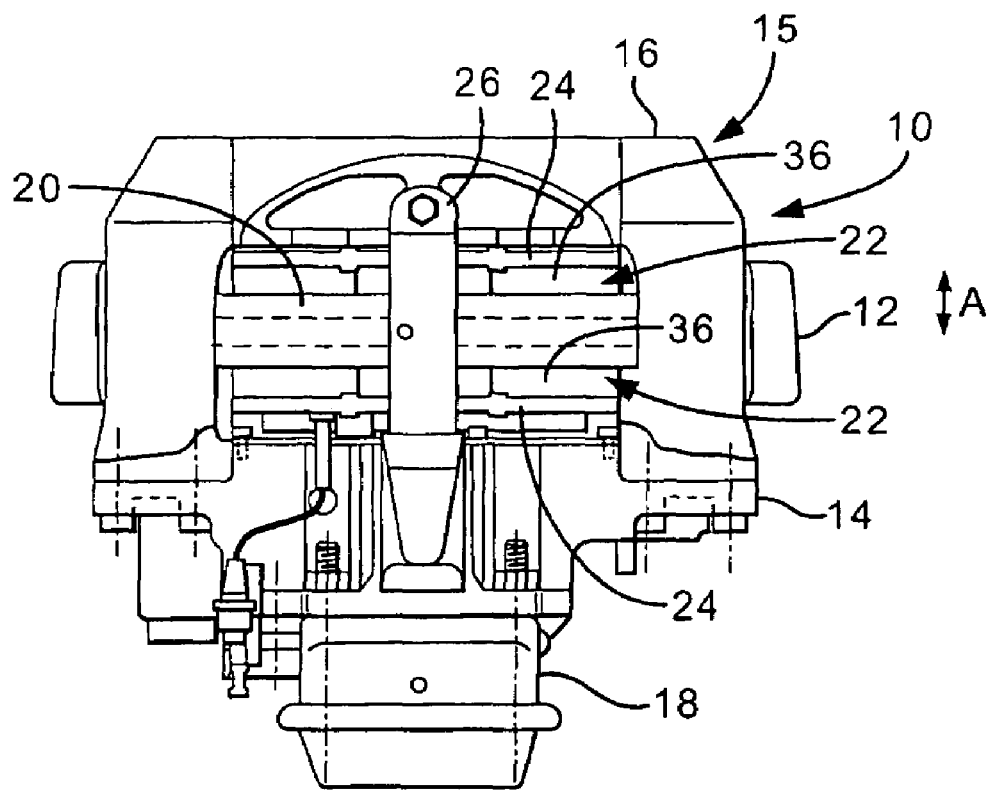
FIG. 1 is a plan view of a disc brake incorporating a prior art disc brake pad assembly.
Figure 2:
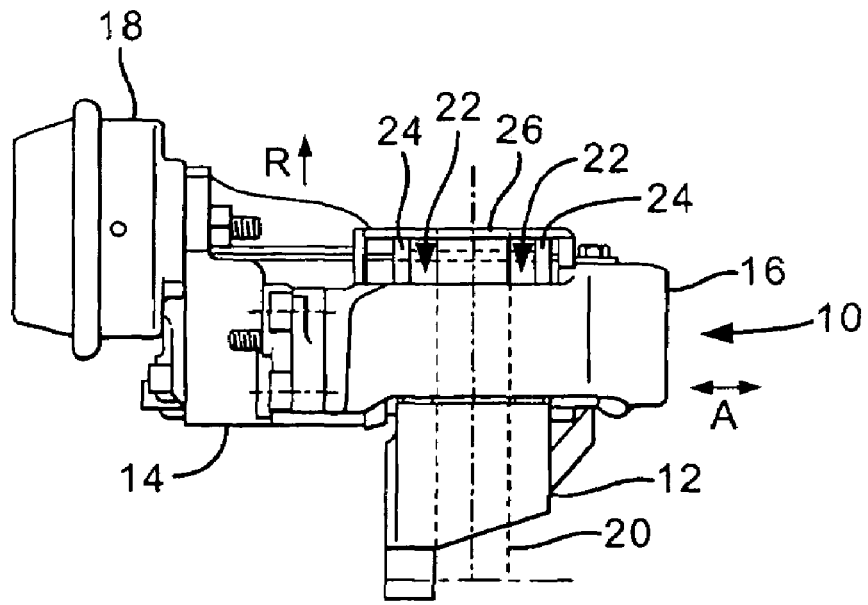
FIG. 2 is an end view of the disc brake of FIG. 1.
Figure 3:
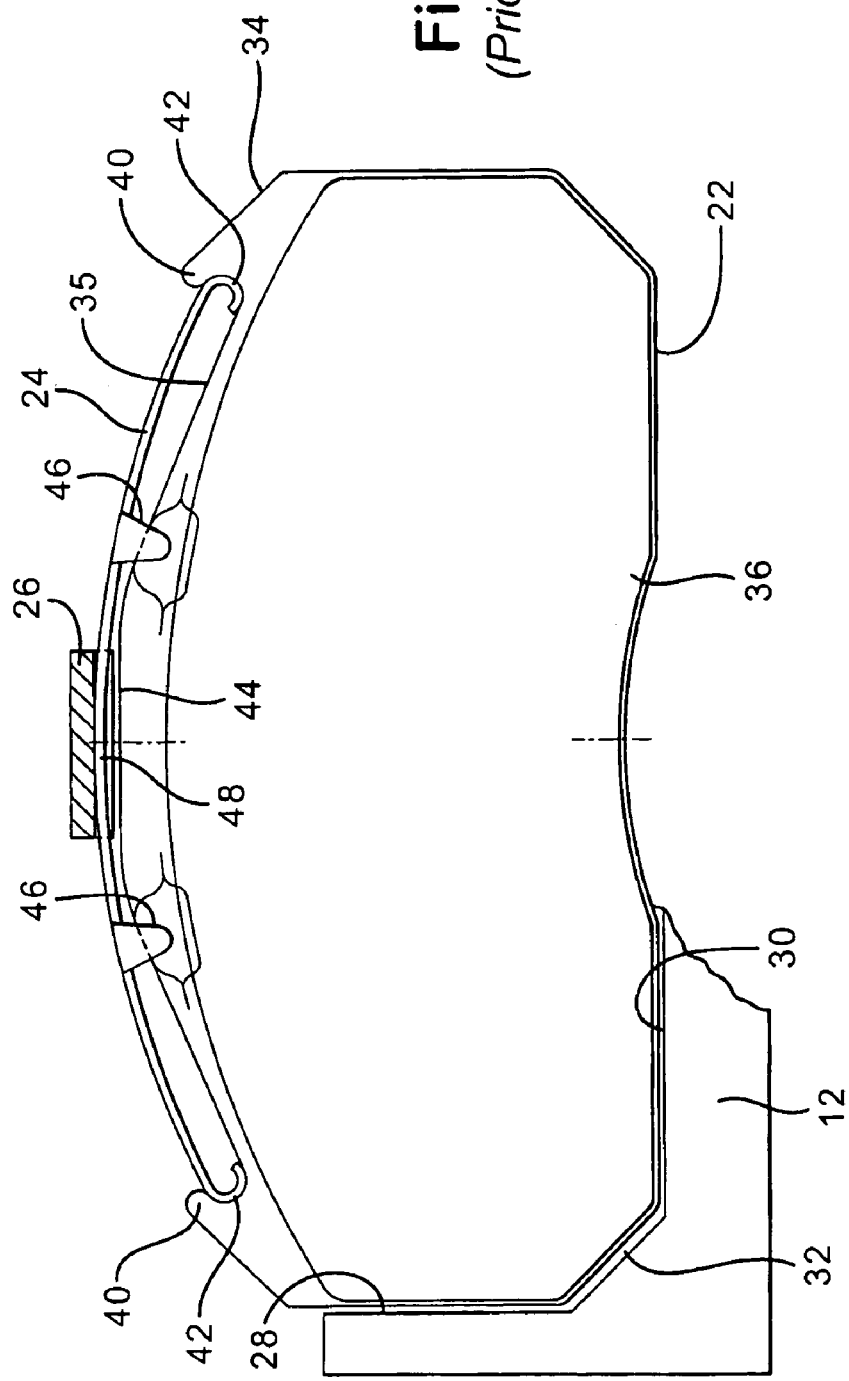
FIG. 3 is an end view of a portion of the carrier and one prior art disc pad and pad spring of FIGS. 1 and 2.
Figure 4:
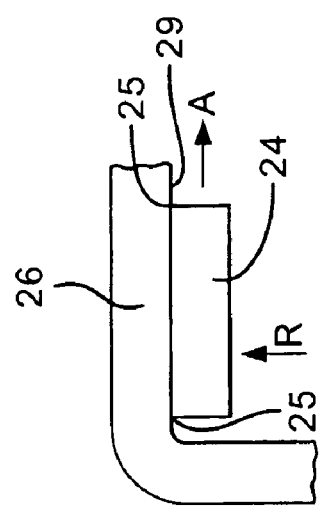
FIG. 4 is a front view of a portion of the pad retainer and pad spring of the disc brake pad assembly of FIGS. 1 to 3.

As shown in FIG. 6, the upturned ends 142 are spaced slightly from the associated abutment 140 when installed. Similarly, the circumferential ends of each slot 152 are spaced slightly from the associated lug 150. In the prior art, as shown in FIG. 3, the spring ends 42 are in permanent engagement with their respective abutment 40 when installed, reducing the tendency of the pad spring 24 to tip relative to the backplate 34. An equivalent feature is not found on the disc brake pad assembly 133 of the present invention. Therefore, the, present invention is particularly applicable to backplates 134 having the lugs 150 that project through the slots 152 in the pad spring 124 since these designs are inherently more prone to the tipping of the pad spring 124 relative to the brake pad 131.

In other embodiments of the present invention, axial movement may be prevented by other means. For example, the pad spring 124 may include protrusions (similar to protrusion 46 of FIG. 3 of the prior art) that wrap around the backplate 134.

Figure 8:
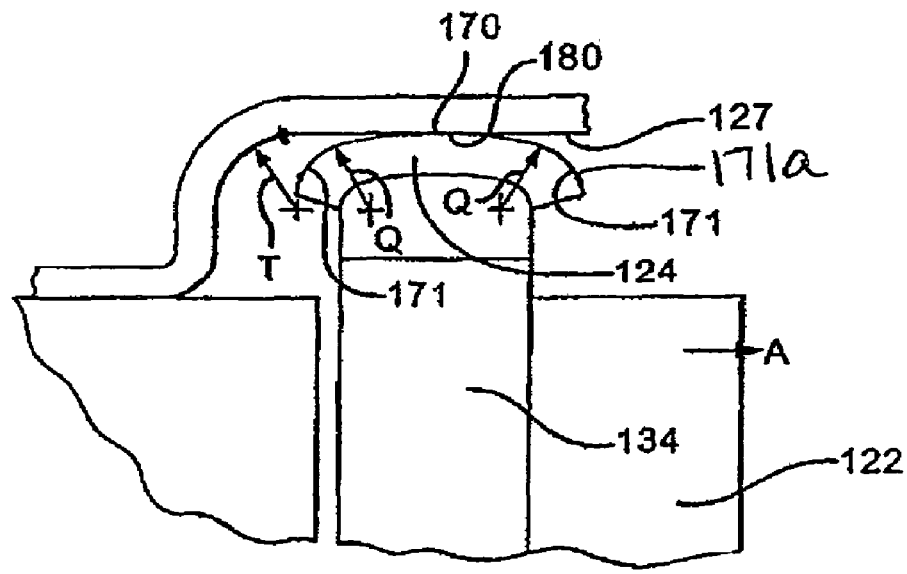
FIG. 8 is an enlarged front view of a portion of the disc brake assembly of FIG. 5.

As shown in FIG. 8, a radially inner surface 127 of a pad retainer 126 abuts and holds down the central portion 148 of the pad spring 124. The inner surface 127 is substantially planar. The area of the pad spring 124 in contact with a pad retainer 126 defines a pad spring surface 170. The pad spring surface 170 is defined by a profile having a substantially planar section 180 and two rounded edges 171 of radius Q. Consideration of FIGS. 5 and 8 show that the rounded edges 171 of the pad spring 124 are formed on the upper surface of laterally extending lugs 171a (best shown in FIG. 5). The lugs 171a are downwardly extending (best shown in FIG. 8). Outer edges of the lugs 171a define the maximum width W2 of the pad spring 124. The rounded edges 171 are symmetrical, allowing the pad spring 124 to be fitted either way around on the brake pad 131 while ensuring a rounded edge 171 is adjacent a bend 126A. Alternately, the profile could be elliptical.

Typically, the pad spring 124 is formed from sheet metal, typically steel or spring steel. A blank is stamped from sheet metal. The sheet metal either including holes 152 or alternatively, the slots 152 are stamped at a later stage. Subsequent pressing operations are then performed on the blank to form the requisite final shape. Preferably, the rounded edges 171 are formed as part of the pressing process.

The pad retainer 126 is secured to an outboard end 189 of the brake caliper 115 by a securing feature, such as a bolt 173. The dotted line in FIG. 7 shows the inside wheel profile 177 of the wheel to which the disc brake assembly 129 is fitted. The space between the disc brake assembly 129, in particular between the pad retainer 126 and the wheel profile 177, is restricted. The pad retainer 126 mounted on the brake caliper 115 is shaped to locate within the space provided. The radius of the inner surface 127 of the pad retainer 126 is R1, and the radius of the bolt 173 is R2, which is less than R1 because of the space envelope. Both radii have a center at the wheel axis, which is indicated by P. To accommodate the location of the bolt 173 on the brake caliper 115, the pad retainer 126 includes a crook in the form of the bend 126A. The bend 126A has a radius T substantially equal to the radius Q of the rounded edge 171 of the pad spring surface 170. In this embodiment, T and Q are between 5.25 mm and 6.75 mm. However, this range can be widened. In particular, the bend 126A accommodates the fact that the bolt 173 has a smaller radius than the inner surface 127. The pad retainer 126 further includes a second bend 126B.

In another embodiment, the pad retainer 126 could include a crook in the form of a turn, a curve, or any other feature which allows the second radius R2 to be smaller than the first radius R1. Providing a rounded edge 171 on the pad spring 124 adjacent to the crook ensures that the pad spring 124 does not dig into the crook.

Before the pad spring 124 is fitted onto the lugs 150, the pad spring 124 has an arcuate profile with a radius of curvature shorter than shown in FIG. 6. To fit the pad spring 124 to the backplate 134, it must be compressed by a certain amount for the slots 152 to fit over both the lugs 150. Once fitted, a certain amount of relaxation occurs such that the circumferentially outermost edge of the slots 152 contact the radially outermost face of the lugs 150, retaining the pad spring 124 on the backplate 134 before mounting of the disc brake pad assembly 133 in the disc brake 10. In other embodiments, the lugs 150 may not perform this circumferential retaining function.

FIG. 6 illustrates the disc brake pad assembly 133 when assembled on the disc brake 10 with the pad retainer 126 in place. The pad retainer 126 depresses the central portion 148 of the pad spring 124 such chat the circumferentially outermost edges of the slots 152 no longer contact the lugs 150, creating a space between the circumferentially innermost edges of the slots 152 and the lugs 150.

When the backplate 134 is subjected to radially outward accelerative loads (for example, due to a vehicle traveling over uneven terrain), the loads decrease the distance S between the pad retainer 126 and the central region 144 of the backplate 134. This causes the pad spring 124 to straighten along its length L and the upturned ends 142 to slide circumferentially outwardly upward until they contact the abutments 140. Further deflections towards the radially outer face 135 of the backplate 134 up to the position 166 have a significantly higher spring rate due to the pad spring 124 entering an elastic "buckling" mode of deflection in which the central portion 148 continues to straighten, but the portions intermediate the central portion 148 and the upturned ends 142 are forced to curve away from the radially outer face 135.

During radial movement as described above, the central portion 148 of the pad spring 124 and the pad retainer 126 are in contact over the pad spring surface 170, and the pad retainer 126 restrains radial movement of the brake pad 131.

Actuation of the brakes moves the brake pad 131 toward the rotor in direction A and moves the pad spring 124 relative to the pad retainer 126. The rounded edge 171 profile of the pad spring 124 ensures that even when the pad spring surface 170 and the pad retainer 126 are not parallel, the rounded edge 171 does not indent into the pad retainer 126. Therefore, movement of the pad spring 124 is not inhibited and braking performance is not affected.

It should be understood tat numerous changes may be made within the scope of the present invention. For example, alternative means of securing the pad spring 124 to the backplate 134 may be employed, and other suitable shapes of the rounded edge 171 and the abutment 140 (e.g., such as inwardly curved or straight ends) can be employed. The circumferential restraint does no need to occur at the extreme ends of the pad spring 124. For example, the abutments 140 for providing circumferential restraint may be die circumferential inner faces of the tugs 150 which restrain the circumferentially inner edges of the slots 152.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A disc brake assembly comprising:
a brake caliper having an outboard side;
a brake pad;
a pad spring including a spring planar region, wherein the pad spring is substantially elongate and defines a longitudinal direction; and
a pad retainer including a retainer planar region positioned at a first radius to restrain radial movement of the brake pad, wherein the pad retainer is secured to the outboard side of the brake caliper at a second radius that is less than the first radius, the pad retainer further including a crook at an end of the retainer planar region,
wherein the spring planar region engages the pad retainer, thereby defining an engaging region of the spring planar region, and
wherein a lateral edge region of the engaging region adjacent to the outboard side of the brake caliper is defined by a laterally and downwardly extending lug having an upper surface, wherein the upper surface defines a rounded edge.

2. The disc brake assembly according to claim 1 wherein the pad spring is substantially curved.

3. The disc brake assembly according to claim 1 further including a backplate, wherein the pad spring further includes radially outwardly curved ends that limit circumferential movement of the pad spring relative to the backplate.

4. The disc brake assembly according to claim 3 wherein the backplate includes complementary curved surfaces for abutment with the radially outwardly curved ends of the pad spring.

5. The disc brake assembly according to claim 1 further including a backplate having a backplate protrusion, wherein the pad spring further includes an aperture, and the backplate protrusion of the backplate is located in the aperture of the pad spring to prevent axial movement between the pad spring and the backplate.

6. The disc brake assembly according to claim 5 wherein the pad spring includes a spring protrusion located around the backplate to assist in preventing axial movement between the pad spring and the backplate.

7. The disc brake assembly according to claim 1 wherein the crook has a crook radius that allows the second radius to be less than the first radius, the crook radius is substantially equal to a lateral edge radius of the lateral edge region of the pad spring, and the lateral edge region of the pad spring is adjacent to the crook.

8. The disc brake assembly according to claim 7 wherein the crook radius is between 4.0 mm and 8.0 mm.

9. The disc brake assembly as related in claim 8 wherein the crook radius is between 5.0 mm and 7.0 mm.

10. The disc brake assembly as recited in claim 9 wherein the crook radius is between 5.25 mm and 6.75 mm.

11. A disc brake assembly comprising:
a brake caliper having an outboard side;
a brake pad;
a pad spring including a spring planar region, radially outwardly curved ends and an aperture, wherein the pad spring is substantially elongate and defines a longitudinal direction;
a pad retainer including a retainer planar region positioned at a first radius to restrain radial movement of the brake pad, wherein the pad retainer is secured to the outboard side of the brake caliper at a second radius that is less than the first radius, the pad retainer further including a crook at an end of the retainer planar region, wherein the spring planar region engages the pad retainer, thereby defining an engaging region of the spring planar region, and a lateral edge region of the engaging region adjacent to the outboard side of the brake caliper is defined by a laterally and downwardly extending lug having an upper surface, wherein the upper surface defines a rounded edge; and
a backplate including complementary curved surfaces and a backplate protrusion, wherein the radially outwardly curved ends of the pad spring radially retain the pad spring on the backplate and the complementary curved surfaces of the backplate abut the radially outwardly curved ends of the pad spring, and wherein the backplate protrusion of the backplate is located in the aperture of the pad spring to prevent axial movement between the pad spring and the backplate.

12. The disc brake assembly according to claim 1 wherein the brake caliper includes an inboard side, a second lateral edge region of the engaging region of the spring planar region adjacent to the inboard side of the brake caliper is defined by a second laterally and downwardly extending lug having a second upper surface, and the second upper surface defines a second rounded edge.

13. The disc brake assembly according to claim 1 wherein the pad spring is defined by a length and a width, and the engaging region of the spring planar region that engages the pad retainer defines a maximum width of the pad spring.

14. The disc brake assembly according to claim 13 wherein the pad spring includes longitudinal ends, and the longitudinal ends have a reduced width that is less than the maximum width.

15. The disc brake assembly as defined in claim 13 wherein the pad spring has a pad spring inboard side and a pad spring outboard side, and the maximum width of the pad spring is defined by the laterally and downwardly extending lug projecting from the pad spring outboard side and a second laterally and downwardly extending lug projecting from the pad spring inboard side.

16. The disc brake assembly as defined in claim 15 wherein the second laterally and downwardly extending lug is bent downwardly to provide a second lateral edge region of the engaging region of the spring planar region that engages the pad retainer.

17. The disc brake assembly as defined in claim 15 wherein the second laterally and downwardly extending lug provides a second lateral edge region.

18. A method of making a disc brake assembly including a brake caliper having an outboard side, a brake pad, a pad spring including a spring planar region that is substantially elongate and defines a longitudinal direction, and a pad retainer including a retainer planar region positioned at a first radius to restrain radial movement of the brake pad,
wherein the pad retainer is secured to the outboard side of the brake caliper at a second radius that is less than the first radius, the pad retainer further including a crook at an end of the retainer planar region, wherein the spring planar region engages the pad retainer, thereby defining an engaging region of the spring planar region, and a lateral edge region of the engaging region adjacent to the outboard side of the brake caliper is defined by a laterally and downwardly extending lug having an upper surface, wherein the upper surface defines a rounded edge, the method comprising the steps of:
stamping a pad spring blank from sheet metal to form the pad spring including a laterally extending lug;
performing a pressing operation to bend the laterally extending lug downwardly to provide the laterally and downwardly extending lug and to round the upper surface of the laterally and downwardly extending lug to form the rounded edge; and
assembling the disc brake assembly.

\* \* \* \* \*